Oct. 25, 1960   A. T. ZAGWYN   2,957,707
RESILIENT WHEEL MOUNTING OF CART WHEELS
Filed March 31, 1958

INVENTOR.
ANTHONY T. ZAGWYN
BY
Wheeler, Wheeler & Wheeler
ATTORNEYS

2,957,707
RESILIENT WHEEL MOUNTING OF CART WHEELS

Anthony T. Zagwyn, Delavan, Wis., assignor to A.J. Industries Corporation, Delavan, Wis., a corporation of Wisconsin Filed Mar. 31, 1958, Ser. No. 725,174

7 Claims. (Cl. 280—124)

This invention relates to improvements in resilient wheel mounting of cart wheels.

The particular cart in which this invention has been incorporated comprises a golf cart for carriage of a golf bag loaded with golf clubs, but it will be understood from the description of the invention as set forth below that the invention relates to the provision of a resilient mounting of a cart wheel or cart wheel axle in connection with the type of folding cart wheel apparatus wherein the wheels of the cart are swingable to and from a folded position, and the wheels are therefore sometimes disposed adjacent a central frame or column and at other times are spread apart at some distance from such a supporting column or frame, preferably with the wheel mounting so devised that the wheels remain in parallelism, one with the other, and in parallel relation to the supporting column or frame.

More particularly the invention includes a "knee action" axle mounted with respect to a spring retainer box of maximum strength and provided with a very rigid and rugged means for attachment to swingable arms which form a part of the "folding" mechanism of the cart.

Figure 1:
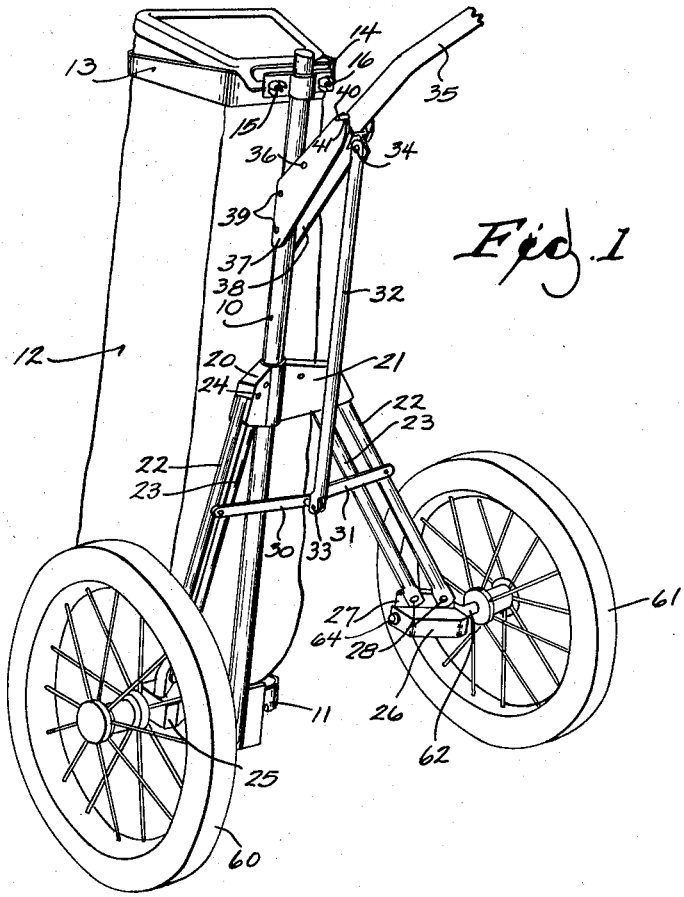
Fig. 1 is a perspective of a two-wheel golf cart equipped with the spring axle mounting of this invention.

Referring generally to the golf cart as shown in Fig. 1 and comprising the environment in which this invention is incorporated, it will be seen in Fig. 1 that the central backbone column 10 of the golf cart is equipped at its lower end with a foot 11 positioned to underlie the lower end of the golf bag 12. At the upper end of the column, there is a clamp-like frame 13 encompassing the upper end of the golf bag and secured to the column by an encircling plate 14 secured to the frame 13 by appropriate wing nuts and screws at 15—16.

Approximately midway of the length of the column 10, there is fixed thereto in the form of some sheet metal stampings, a pair of pelvis shaped leg mounts 20 and 21. These extend laterally and, in terms of the golf bag being at the forward end of the cart, these leg mounts extend somewhat rearwardly. They are formed of spaced plates so that each mount 20 or 21 may receive in hinged relation a pair of parallel legs 22—23. Hinge pins 24, each extending through the pelvis mount and through a leg, permit the legs to swing in parallelism as will be seen in Fig. 1.

At the lower end of each pair of legs 22—23 is a wheel mount 25—26 one of the heavy structural elements of which is an ankle portion 27 to which the lower end of each leg 22—23 is pivotally secured by bolts 28. Thus it will be seen that because of the pinned relation of the legs 22—23 to the ankle portion 27 and the pinned relation of said legs 22—23 to a pelvis plate such as 21, the wheel mount 26 is swingable outwardly and somewhat rearwardly upon the extended ends of the legs 22 and 23 held in parallel relation.

To manually control the position of the legs and wheel mounts above described, a midpoint of each leg 22 is used as a point of attachment for a toggle arm 30 or 31 which extends to an actuating member 32 to which the toggle arms are pivotally connected at 33. This actuating arm 32 extends upwardly from the toggle arms to a pivotal connection at 34 with operating handle 35. The operating handle is mounted pivotally upon handle pin 36 extending across between handle plates 37 and 38 which are secured at 39 to the backbone column 10. A spring latch pin 40 which may snap into a groove 41 in the top margin of plate 37 is provided so that the handle 35 will remain in the position shown in Fig. 1 unless the latch pin 40 is manually retracted from groove 41 and the handle is thrust downwardly in a swinging motion about handle pin 36 so as to push the toggle levers downwardly and force the legs to swing inwardly toward backbone column 10.

Attention is now directed particularly to the wheel mount 26 which provides resilient support for the structure thus far described.

Figure 2:
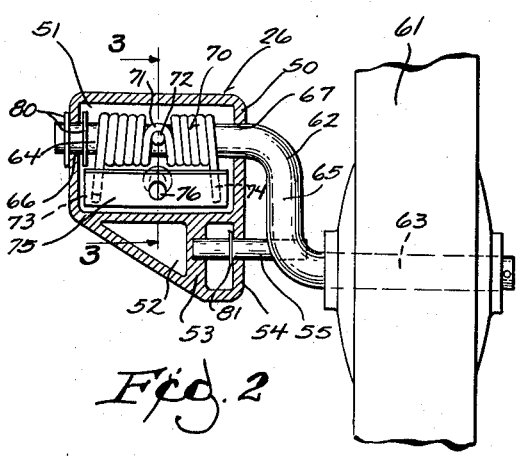
Fig. 2 is a detail view showing the resilient spring mounting of the knee action wheel axle mounting of this invention; the spring housing being shown in horizontal section and the wheel upon the axle being shown fragmentarily in elevation.
Figure 3:
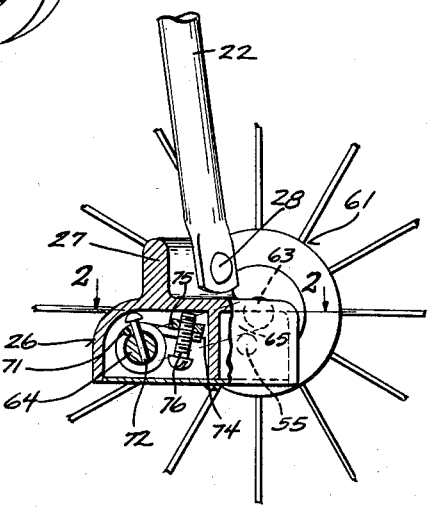
Fig. 3 is a section on line 3—3 of Fig. 2 but showing fragmentarily one of the arms of the foldable wheel mount.

As shown most clearly in Fig. 2, the wheel mount 26 includes not only the heavy angle portion 27 referred to above, but it is shaped to provide a housing 50 including a spring chamber 51, a bracing chamber 52 and spaced walls 53 and 54 through or into which a stop 55 is secured.

There are two wheels for the particular cart shown in the drawings. These may be of any design but are shown here as wire spoked wheels 60 and 61. Individually, these wheels are mounted on their respective crank shaped axles 62. These crank shaped axles include a wheel bearing portion 63, a mount bearing portion 64, and an off-set to provide a crank arm portion 65. The mount bearing portion extends through the housing 50 so as to find, in the housing walls, a bearing at 66 and a bearing at 67. Thus when the wheel mount 26 is secured upon the cart structure described above including the legs 22 and 23, the crank action of the axle 62 may be depended upon for resilient support of the golf cart if resilient biasing means be used to control the crank action which is involved when the mounted bearing portion 64 of the crank shaped axle is rotated in the bearings 66 and 67.

To provide the resilient action referred to above, there is provided in the spring chamber 51 a double torsion spring 70 the midpoint of which at 71 is bent about an axle pin 72 as seen clearly in Fig. 2. Then each side of the spring 70 is wound helically about the mount bearing portion 64 of the axle 62. The opposite ends 73—74 of the spring 70 are extended laterally of the helical convolutions of the spring and are disposed as shown in Fig. 2 so as to lie against an adjusting plate 75 which is positioned between these outstanding ends and the top wall.

Extending threadedly through the adjusting plate 75 is an adjusting screw 76, and it is thus possible by turning the adjusting screw 76 into abutment against the upper wall of the chamber to force the adjusting plate downwardly against the extended portions 73—74 of the spring 70 whereby to adjust the spring; but before such adjustment is made, it is possible by crank action of the crank shaped axle to apply such torsional stress upon the spring 70 as to closely approximate the bias needed for support of the load to be carried by the wheel 60 or 61. Then stop pin 55 may be inserted as shown in Fig. 2 to prevent the bias of spring 70 from swinging the crank shaped axle beyond the stop.

To secure the axle 62 against axial displacement respecting the housing 50, spring washers 80 are provided as shown in Fig. 2, and to prevent displacement of stop pin 55 after it has been inserted through and into walls 53—54, a spring washer at 81 is provided.

I claim:

1. In a cart having a plurality of load bearing wheels each having a separate wheel mount on an outstanding leg; a wheel mount secured to said leg and comprising a walled housing including a spring chamber providing bearing openings in opposite walls; a crank shaped wheel equipped axle having a wheel bearing portion and a crank portion outside said housing; and a mount bearing portion extending through said bearing openings and across said chamber; means for securing a spring to said mount bearing portion; a spring secured to said means and supported in said chamber to bias the crank shaped axle for movement in a direction contra to the wheel load, and a stop mounted to said housing and extending into the path of movement of the crank shaped axle, said outstanding leg including two parallel leg members and said walled housing being provided with an ankle portion, said legs being adjustably mounted to the cart and to said ankle portion.

2. In a cart having a plurality of load bearing wheels each having a separate wheel mount adjustably connected to an outstanding leg apparatus, each said outstanding leg comprising parallel leg members adjustably secured to the cart, a wheel mount adjustably secured to said leg members and comprising a frame including a spring retainer and bearing openings, a crank shaped wheel equipped axle having a wheel bearing portion and a crank portion, said axle further having a mount bearing portion extending through said frame openings, a spring between said frame and said mount bearing portion positioned to bias the crank shaped axle for movement in a direction contra to the wheel load.

3. A wheel mount for the axle of a load bearing wheel having a crank shaped axle including a wheel bearing portion, a mount bearing portion and an offset therebetween providing a crank arm portion; said wheel mount including an inverted cup shaped frame divided into open bottomed chambers having walls comprising exterior walls of said frame provided with bearing openings through opposite walls for reception of said mount bearing portion in position to span one of said chambers; an axle pin centrally of said chamber and attached to said mount bearing portion, a spring spirally wound about said mount bearing portion and having its mid portion connected to said pin, the ends of said spring being in braced relation to the cup of the frame.

4. In a cart having a plurality of load bearing wheels each having a separate wheel mount on an outstanding leg, a wheel mount secured to said leg and comprising a walled housing including a spring chamber providing bearing openings in opposite walls; a crank shaped axle having a wheel bearing portion and a crank portion outside of said housing and forming a stop coacting portion, and a mount bearing portion extending through said bearing openings and across said chamber; means for securing a spring to said mount bearing axle portion; a spring secured to said means and supported in said chamber to bias the axle for crank movement in a direction contra to the wheel load; and a stop coacting with said housing and extending into the path of movement of the crank portion of the axle, said walled housing being provided with an ankle portion and said leg being pivotally mounted to the cart and to said ankle portion.

5. In a cart having a plurality of load bearing wheels each having a separate wheel mount on an outstanding leg, a wheel mount secured to said leg and comprising a walled housing including a spring chamber providing bearing openings in opposite walls; a crank shaped axle having a wheel bearing portion and a crank portion outside of said housing, and a mount bearing portion extending through said bearing openings and across said chamber; said walled housing being provided with an ankle portion and said leg being adjustably mounted to the cart and to said ankle portion; means for securing a spring to said mount bearing axle portion; a spring secured to said means and supported in said chamber to bias the axle for movement in a direction contra to the wheel load; and a stop acting between said housing and said axle, a plate positioned between an end of the spring and a wall of said housing, and a screw threadedly engaging said plate and bearing on said housing wall, said stop being positioned to establish a limit of movement of the axle in a direction for unwinding said spring.

6. In a cart having a plurality of load bearing wheels each having a separate wheel mount on an outstanding leg, a wheel mount secured to said leg and comprising a walled housing including a spring chamber providing bearing openings in opposite walls; a crank shaped axle having a wheel bearing portion and a crank portion outside of said housing, a mount bearing portion extending through said bearing openings and across said chamber; means for securing a spring to said mount bearing axle portion; a spring secured to said means and supported in said chamber to bias the axle for crank movement in a direction contra to the wheel load; and a stop acting between said housing and said axle, said stop being positioned to prevent crank movement of the axle beyond a predetermined limit in a direction for unwinding said spring, said walled housing being provided with an ankle portion and said leg being pivotally adjustably mounted to the cart and to the ankle portion, and linkage connected between the leg and the cart whereby to limit pivotal movement of the leg.

7. A cart having a central elongated frame and a pair of leg assemblies connected thereto for swinging adjustment between a position in which the leg assemblies are divergent from the axis of the frame and a position in which the assemblies are more nearly parallel with said axis; a load bearing wheel and leg connected wheel mount for each of said assemblies; said wheel mount comprising a walled housing including a spring chamber providing bearing openings in opposite walls, a crank shaped axle having a wheel bearing portion and a crank portion outside of said housing, and a mount bearing portion extending through said bearing openings and across said chamber, means for securing a spring to said mount bearing axle portion, a spring secured to said means and supported in said chamber to bias the axle for movement in a direction contra to wheel load; said walled housing being provided with an ankle portion and each of said leg assemblies comprising a plurality of members connected articulately to the frame and to said ankle portion for control of the angular relation of the wheel mount and frame.

References Cited in the file of this patent

UNITED STATES PATENTS

| 223,542 | Rice | Jan. 13, 1880 |
| 2,515,704 | Gardiner | July 18, 1950 |
| 2,599,354 | Stableford | June 3, 1952 |
| 2,688,481 | Bergquist | Sept. 7, 1954 |
| 2,701,727 | Linn | Feb. 8, 1955 |

FOREIGN PATENTS

| 645,999 | Great Britain | Nov. 15, 1950 |